United States Patent [19]

Endo et al.

[11] 4,446,824
[45] May 8, 1984

[54] SUCTION SYSTEM IN AN ENGINE

[75] Inventors: Norio Endo, Kameoka; Yoshiaki Asayama; Masami Kabuto, both of Himeji, all of Japan

[73] Assignees: Mitsubishi Denki K.K.; Mitsubishi Jidosha Kogyo K.K., both of Tokyo, Japan

[21] Appl. No.: 341,147

[22] Filed: Jan. 20, 1982

Related U.S. Application Data

[62] Division of Ser. No. 125,745, Feb. 28, 1980, Pat. No. 4,361,119.

[30] Foreign Application Priority Data

Mar. 1, 1979 [JP] Japan ................... 54-25951

[51] Int. Cl.³ ............................................. F02B 75/18
[52] U.S. Cl. .................................. 123/52 M; 73/118; 123/494
[58] Field of Search ................... 123/494, 478, 52 M; 73/199, 204, 118

[56] References Cited

U.S. PATENT DOCUMENTS 3,648,518 3/1972 Hans et al. ............................. 73/204
3,975,951 8/1976 Kohama et al. ..................... 123/494

Primary Examiner—Craig R. Feinberg
Attorney, Agent, or Firm—Wenderoth, Lind & Ponack

[57] ABSTRACT

A suction air volume detecting means to be provided in a suction system in an engine, in particular an automotive engine to electrically detect the air volume to be sucked into the engine is mounted within a suction air expansion chamber of the suction system provided to reduce the pulsation of the suctioned air for the purpose that the electrical circuit elements of the suction air volume detecting means, in particular, transistors, etc. are protected from being heated by heat radiated from the engine and from being caused to misoperate by external electrical waves.

1 Claim, 3 Drawing Figures

SUCTION SYSTEM IN AN ENGINE

This is a divisional application of application Ser. No. 125,745, filed Feb. 28, 1980, now U.S. Pat. No. 4,361,119.

BACKGROUND OF THE INVENTION

The present invention relates to a suction system in an engine and more particularly to a suction system for an automotive engine provided with a suction air volume detecting means.

In general, a suction air volume detecting means for an engine is provided in the suction system to detect the air volume sucked into it electrically, and has transistors, condensers, etc. as disclosed in Japanese Patent Publication No. 28174/1977. Such a detecting means is usually located in the vicinity of the engine. Therefore, it is necessary in the detecting means to take into consideration protecting it against the heat radiated from the engine and to prevent it from being affected by electrical wave interference originating from the high voltage ignition system of the engine, etc.

A typical conventional arrangement of a suction air volume detecting means for an automotive engine will be briefly explained below in reference to FIG. 1 of the attached drawings wherein such a means is diagrammatically represented. In the drawing, the reference numeral 1 designates a body of an air cleaner having an air inlet 2, an air cleaner element 3 comprising e.g. filter paper, etc., and an air cleaning chamber 4 formed within body 1. A suction air volume detecting means 5 comprises a flow regulator 6, an air volume detector 7 comprising e.g. a heating wire, and an amplifier 8 comprising various electrical circuit elements including heat sensitive elements such as transistors. An expansion chamber is provided which is adapted to be connected to a suction pipe of an engine (not shown) through a duct 10, expansion chamber 9 having the purpose of reducing the pulsation of the suction air to the engine in order to increase the accuracy of measurement of the air suction volume detecting means 5. However, as explained above, since such a conventional arrangement is provided with no means for protecting it from the heat radiated from the engine and electrical waves from the ingnition system, there is the danger of misoperation.

SUMMARY OF THE INVENTION

It is a primary object of the present invention to provide an air suction system in an engine, in particular an automotive engine, provided with a suction air volume detecting means having electrical circuit elements such as transistors which can prevent the suction air volume detecting means from misoperating due to radiant heat from the engine, external electrical waves, etc.

In accordance with the present invention an air suction system for an automotive engine is provided in which the suction air volume detecting means is mounted within a suction air expansion chamber of the air suction system provided for reducing the pulsation of the air to be sucked into the engine.

BRIEF DESCRIPTIONS OF THE DRAWINGS

Other objects and advantages of this invention will become apparent from the following discription taken in connection with the accompanying drawings wherein are set forth by way of illustration and example certain embodiments of this invention:

DESCRIPTION OF THE PREFERRED EMBODIMENTS

Figure 1:
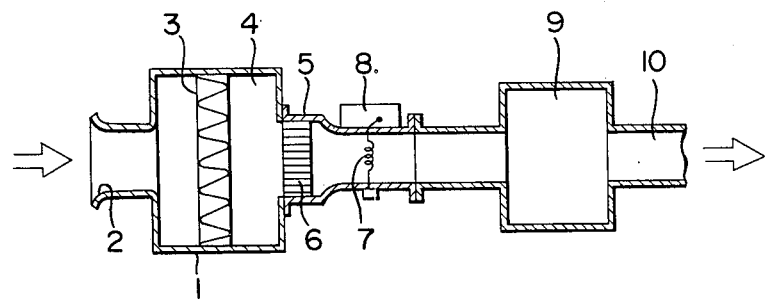
FIG. 1 is a diagrammatic sectional representation of a typical conventional suction air volume detecting means.
Figure 2:
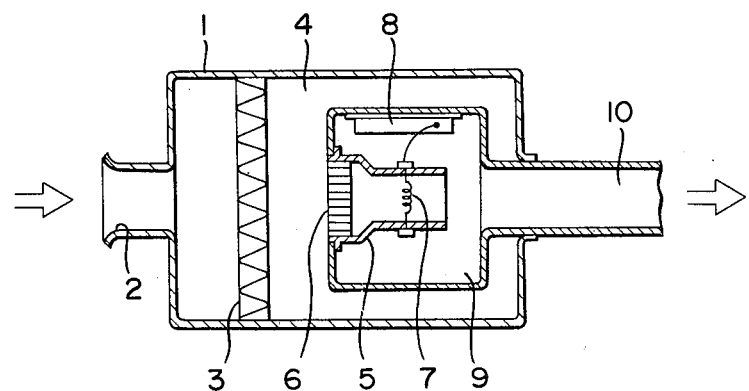
FIG. 2 is a diagrammatic sectional view of one embodiment of the present invention.

Referring now to FIG. 2 of the drawings, there is shown one embodiment of the present invention wherein a suction air volume detecting means 5 having a structure similar to that shown in FIG. 1 is mounted within a suction air expansion chamber 9 of the air suction system in an automotive engine, the suction air expansion chamber 9 itself being mounted on the upstream end of duct 10 within an air cleaning chamber 4 of an air cleaner 1 so as to leave a space between the inner and outer walls of cleaner 1 and chamber 9. As shown in FIG. 2 suction air detecting means 5 together with the amplifier 8 therefore is isolated by a double wall comprising the walls of air cleaning chamber 4 and expansion chamber 9. Thus, suction air volume detecting means 5 is effectively protected from heat radiation from the engine and interference in the amplifier 8 by external electrical waves is prevented.

Figure 3:
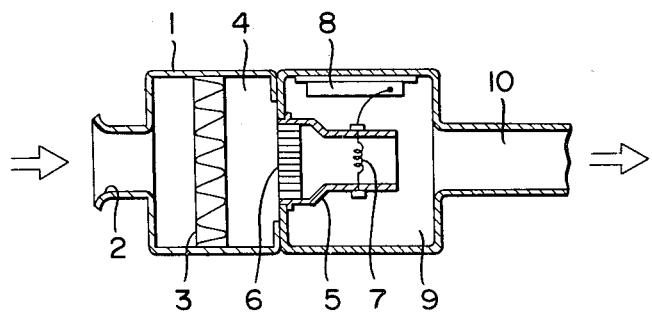
FIG. 3 is a view similar to FIG. 2, but showing another embodiment of the present invention.

FIG. 3 shows another embodiment of the present invention wherein the air suction volume detecting means 5 is mounted in the inner surface of the wall of the suction air expansion chamber 9 which in turn is connected to an air cleaner 1 so that means 5 is protected from heat radiated from the engine and the external electrical waves by means of the wall of air expansion chamber 9 only. Such a structure has also been proved effective in attaining the object of the present invention.

Although the embodiments described above and shown in the drawings refer to a suction air volume detecting means comprising a flow regulator, an air volume detector comprising e.g. a heating wire, and an amplifier comprising various electrical circuit elements to amplify signals from the air volume detecting means, needless to say the suction air volume detecting means may be replaced by a von Kármán's vortex flowmeter as disclosed e.g. in U.S. patent application Ser. No. 956,599 now abandoned or French patent application No. 7831185 or West German Patent Application No. P 28 47 835.5, exhibiting similar effects, in which the flowmeter comprises a duct to draw in air, a vortex generating body disposed within the duct at right angles to the flow direction of the air and a vortex detector having an electrical circuit to detect the frequency of the von Kármán's, vortexes generated by the vortex generating body by the utilization of ultrasonics.

From the foregoing it will be appreciated that, since in the present invention the suction air volume detecting means to detect the air volume sucked into the engine is mounted within the suction air expansion chamber, which is provided to decrease the pulsation of the sucked air, it is effectively protected from heat radiated from the engine and external electrical waves, etc. Further, in accordance with the present invention, since the suction air flow distance from the air inlet to the duct in an air suction system can be made short, pressure losses are decreased and the whole arrangement can be compactly arranged.

What is claimed is:

1. An air intake assembly for use with an internal combustion engine, which comprises:

air inlet means comprising an air cleaner casing having an inlet port for receiving air into said assembly from the ambient space around said assembly and having an outlet port formed in an inner wall and air cleaner means in said casing between said inlet and outlet port;

an expansion chamber on the outside of said air cleaner casing and abutting said inner wall of said air cleaner casing and having an inlet port formed in an inner wall thereof and opening directly into said outlet port of said air cleaner casing and further having an outlet port;

a duct connected to said outlet port of said expansion chamber for discharging air from said assembly; and flow detector means disposed completely within said expansion chamber and having an inlet end mounted in and filling said expansion chamber inlet port and being supported solely in said expansion chamber by a portion of said inner wall of said expansion chamber defining said inlet port thereof so as to be spaced from the outer walls of said expansion chamber and receiving all the air flowing through said air cleaner means, said flow detector means having an outlet end opening into said expansion chamber and having means for detecting a flow rate of air flowing through said flow detector means from said air inlet means to said expansion chamber, and means connected to said detecting means for producing an electrical signal corresponding to said flow rate.

* * * * *